United States Patent [19]
Takai et al.

[11] Patent Number: 5,774,310
[45] Date of Patent: Jun. 30, 1998

[54] MAGNETIC HEAD AND MAGNETIC RECORDING APPARATUS WHICH PREVENT GENERATION OF A FALSE MAGNETIC HEAD TENDING TO DISTURB A PREVIOUSLY FORMED MAGNETIC RECORDING TRACK

[75] Inventors: Shigeyoshi Takai, Neyagawa; Fumio Sakai, Nabari, both of Japan

[73] Assignee: Matsushita Electric Industrial Co., Ltd., Osaka, Japan

[21] Appl. No.: 704,242

[22] Filed: Aug. 28, 1996

[30] Foreign Application Priority Data

Sep. 1, 1995 [JP] Japan .................................. 7-225161

[51] Int. Cl.⁶ .................................................. G11B 5/23
[52] U.S. Cl. .......................................... 360/119; 360/126
[58] Field of Search .......................... 360/119–120, 122, 360/126, 127

[56] References Cited

U.S. PATENT DOCUMENTS

| | | | |
|---|---|---|---|
| 5,164,870 | 11/1992 | Kato | 360/120 |
| 5,184,266 | 2/1993 | Kanai | 360/120 |
| 5,222,006 | 6/1993 | Yanagi | 360/120 |
| 5,227,193 | 7/1993 | Hori | 360/127 |
| 5,227,940 | 7/1993 | Isomura | 360/120 |

FOREIGN PATENT DOCUMENTS

| | | |
|---|---|---|
| 4-353607A | 12/1992 | Japan . |
| 6-314411A | 11/1994 | Japan . |
| 7-134802A | 5/1995 | Japan . |

*Primary Examiner*—A. J. Heinz
*Attorney, Agent, or Firm*—Watson Cole Stevens Davis, P.L.L.C.

[57] ABSTRACT

In a magnetic head including, a pair of magnetic cores, one of the magnetic cores including a first corner portion, a second corner portion and an end portion between the first and second corner portions, and another one of the magnetic cores including a third corner portion, a fourth corner portion and another end portion between the third and fourth corner portions, the first and third corner portions being opposite to each other, the second and fourth corner portions being opposite to each other, the end portion and the another end portion being opposite to each other, and high-saturation-magnetic-flux-density layers, one of the high-saturation-magnetic-flux-density layers covering the end portion and another one of the high-saturation-magnetic-flux-density layers covering the another end portion, wherein a thickness of the high-saturation-magnetic-flux-density layer on at least one of the first, second, third and fourth corner portions within an important area for preventing a false magnetic head is prevented from being less than 0.5 µm.

18 Claims, 7 Drawing Sheets

MAGNETIC HEAD AND MAGNETIC RECORDING APPARATUS WHICH PREVENT GENERATION OF A FALSE MAGNETIC HEAD TENDING TO DISTURB A PREVIOUSLY FORMED MAGNETIC RECORDING TRACK

BACKGROUND OF THE INVENTION AND RELATED ART STATEMENT

The present invention relates to a magnetic head for recording on and/or reproducing from a recording tape signals with a significantly small magnetic gap between high-saturation-magnetic-flux-density thin magnetically conductive layers and a small longitudinal length of the magnetic gap for a small recording track width, a method for producing the magnetic head, and a magnetic recording apparatus with a plurality of the magnetic heads whose azimuth angles are different from each other.

JP-A-4-353607 discloses a method for producing a magnetic head, in which a part of each of thin magnetically conductive layers is removed by etching or laser trimming, and thereafter a positional relationship between the thin magnetically conductive layers is fixed to form a magnetic gap therebetween.

JP-A-6-314411 discloses a method for producing a magnetic head, in which a part of each of thin magnetically conductive layers is removed to determine a longitudinal length of a magnetic gap therebetween by etching, laser beam or electrical discharge machining after a positional relationship between the thin magnetically conductive layers is fixed.

JP-A-7-134802 discloses a positional relation ship between a leading core-end and a trailing core-end for restraining a partial erasing of a previously formed recording track, that is, the trailing core-end extends more deeply in the previously formed recording track in comparison with the leading core-end.

OBJECT AND SUMMARY OF THE INVENTION

An object of the present invention is to provide a magnetic head and magnetic recording apparatus, preferable for restraining disturbance of a previously formed recording track while forming a new recording track adjacent to the previously formed recording track. Another object of the present invention is to provide a method for producing the magnetic head, preferable for correctly determining a longitudinal length of a magnetic gap.

According to the present invention, a magnetic head for recording signals magnetically by forming a recording track on a recording tape, comprises:

a pair of magnetic cores to be energized magnetically, one of the magnetic cores including a first corner portion, a second corner portion and an end portion between the first and second corner portions, and another one of the magnetic cores including a third corner portion, a fourth corner portion and another end portion between the third and fourth corner portions, the first and third corner portions being opposite to each other, the second and fourth peak portions being opposite to each other, and the end portion and another end portion being opposite to each other, high-saturation-magnetic-flux-density layers arranged on the magnetic cores respectively so that one of the high-saturation-magnetic-flux-density layers covering at least the end portion and another one of the high-saturation-magnetic-flux-density layers covering at least the another end portion, and a saturation-magnetic-flux-density of the high-saturation-magnetic-flux-density layers being higher than that of the magnetic cores, and a magnetic gap between the cores or the end portions for magnetizing partially the recording tape, wherein a thickness of the high-saturation-magnetic-flux-density layer covering at least one of the first, second, third and fourth corner portions is prevented from being less than 0.5 $\mu$m.

Since the thickness of the high-saturation-magnetic-flux-density layer covering at least one of the first, second, third and fourth corner portions, that is, the minimum thickness of the high-saturation-magnetic-flux-density layer between the magnetic cores, is prevented from being less than 0.5 $\mu$m, a leakage magnetic flux through the high-saturation-magnetic-flux-density layer on the at least one of the first, second, third and fourth corner portions between the magnetic cores is decreased to a desired level sufficient for preventing an undesirable or unacceptable false magnetic head from being formed at the outside of the magnetic gap over the at least one of the first, second, third and fourth corner portions. Therefore, when the at least one of the first, second, third and fourth corner portions at which the leakage magnetic flux is decreased to the desired level is positioned within an important area or place for restraining disturbance of a previously formed recording track or preventing the undesirable or unacceptable false magnetic head, the disturbance of the previously formed recording track by the undesirable or unacceptable false magnetic head is restrained.

A thickness of the high-saturation-magnetic-flux-density layer on, at least another one of the first, second, third and fourth corner portions, that is, the at least another one of the first, second, third and fourth corner portions within an unimportant area or place for restraining disturbance of the previously formed recording track, may be less than 0.5 $\mu$m, or the high-saturation-magnetic-flux-density layer may be interrupted on the at least another one of the first, second, third and fourth corner portions, that is, may accept a slight amount of the leakage magnetic flux or a slight amount or degree of the false magnetic head at the at least another one of the first, second, third and fourth corner portions. Since, while keeping the thickness of the high-saturation-magnetic-flux-density layer covering the at least one of the first, second, third and fourth corner portions equal to or more than 0.5 $\mu$m, the thickness of the high-saturation-magnetic-flux-density layer on the at least another one of the first, second, third and fourth corner portions may be less than 0.5 $\mu$m or the high-saturation-magnetic-flux-density layer may be interrupted on the at least another one of the first, second, third and fourth corner portions, a precise accuracy of adjusting an arrangement and/or thickness of the high-saturation-magnetic-flux-density layers on the at least another one of the first, second, third and fourth corner portions is not necessary so that a production of the magnetic head with a correctly adjusted magnetic gap longitudinal length is easily performed.

When a distance between the first corner portion and the previously formed recording track (=, for example, a distance between the first corner portion and a longitudinally extending central axis of the previously formed recording track) is smaller than a distance between the second corner portion and the previously formed recording track (=, for example, a distance between the second corner portion and the longitudinally extending central axis of the previously formed recording track) in a width direction of the recording track perpendicular to a magnetic head proceeding direction relative to the recording tape, when the one of the magnetic cores is a front magnetic core in the magnetic head proceeding direction relative to the recording tape, the another one of the magnetic cores is a rear magnetic core in the magnetic head proceeding direction, and the distance between the first corner portion and the previously formed recording track is smaller than the distance between the second peak portion and the previously formed recording track in the width direction of the recording track, and/or when the distance between the first corner portion and the previously formed recording track is smaller than the distance between the second corner portion and the previously formed recording track in the width direction of the recording track, and the distance between the first corner portion and the previously formed recording track is smaller than the distance between the third corner portion and the previously formed recording track (=, for example, a distance between the third corner portion and the longitudinally extending central axis of the previously formed recording track) in the width direction of the recording track, the first corner portion may be deemed to be within the important area or place for particularly azimuth-angled magnetic heads and/or for particularly ME type magnetic recording tapes in which tape magnetizing portion is formed not at a rear core side, but formed at a front core side, relative to the magnetic gap.

When the one of the magnetic cores is the front magnetic core in the magnetic head proceeding direction relative to the recording tape, the another one of the magnetic cores is the rear magnetic core in the magnetic head proceeding direction, the distance between the first corner portion and the previously formed recording track is smaller than the distance between the second corner portion and the previously formed recording track in the width direction of the recording track, and the distance between the first corner portion and the previously formed recording track is smaller than the distance between the third corner portion and the previously formed recording track in the width direction of the recording track, and/or when the one of the magnetic cores is the front magnetic core in the magnetic head proceeding direction relative to the recording tape, the another one of the magnetic cores is the rear magnetic core in the magnetic head proceeding direction, the distance between the first corner portion and the previously formed recording track is smaller than the distance between the second corner portion and the previously formed recording track in the width direction of the recording track, and the first corner portion is rear relative to the second corner portion in the magnetic head proceeding direction, the first corner portion may be deemed to be within the most important area or place for particularly the azimuth angled magnetic heads and/or for particularly the ME type magnetic recording tapes.

Figure 8:
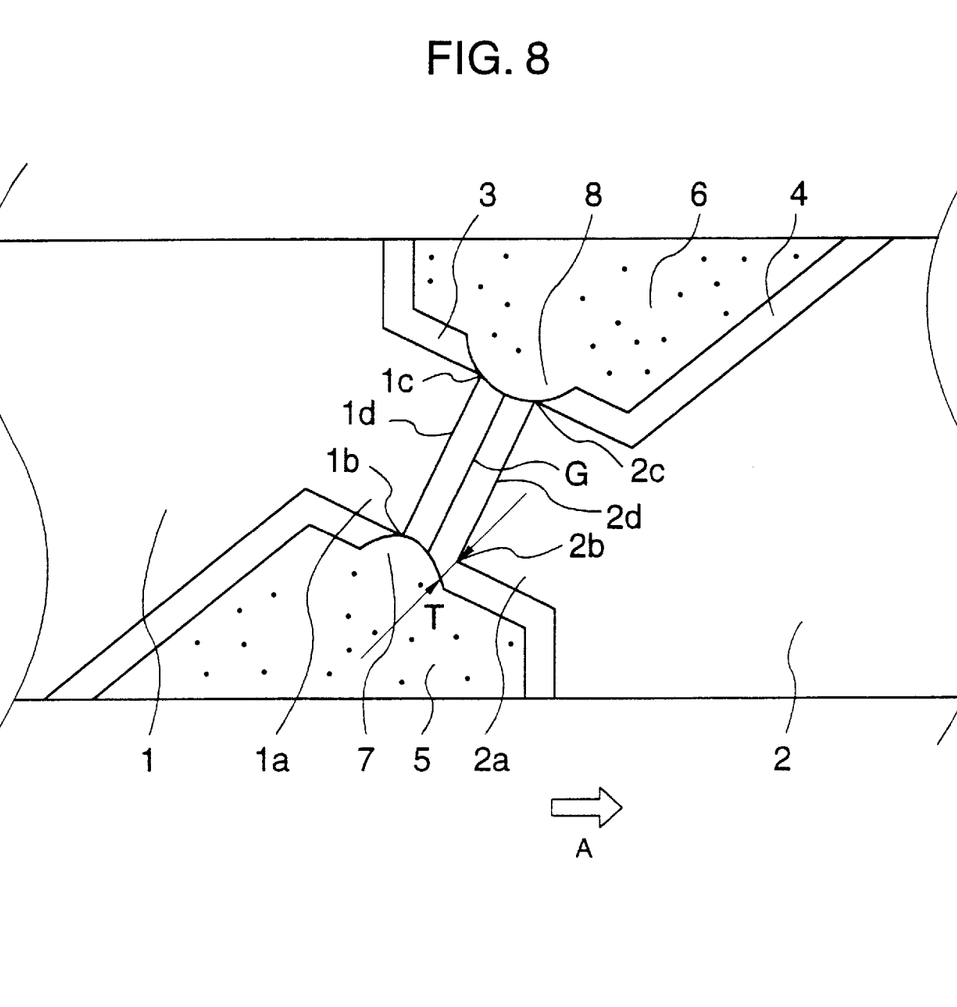
FIG. 8 is a schematic view of an arrangement of another magnetic head according to the present invention.

When the thickness of the high-saturation-magnetic-flux-density layer on the first corner portion is prevented from being less than 0.5 $\mu$m and the first corner portion is arranged within the important area or place or the most important area or place, the thickness of the high-saturation-magnetic-flux-density layer on the third corner portion may be less than 0.5 $\mu$m or the high-saturation-magnetic-flux-density layer may be interrupted on the third corner portion, and/or the thickness of the high-saturation-magnetic-flux-density layer on at least one of the second and fourth corner portions may be less than 0.5 $\mu$m or the high-saturation-magnetic-flux-density layer may be interrupted on at least one of the second and fourth corner portions, as shown in FIG. 8. At least one of the high-saturation-magnetic-flux-density layers may be partially interrupted on at least one of the first, second, third and fourth corner portions, and/or on a part of at least one of the end portions adjacent to the at least one of the first, second, third and fourth corner portions. A thickness of each of the high-saturation-magnetic-flux-density layers on the end portion and another end portion may be 1 to 30 $\mu$m.

According to the present invention, a method for producing a magnetic head, comprises the steps of:

forming a pair of magnetic cores, one of the magnetic cores including a first corner portion, a second corner portion and an end portion between the first and second corner portions, and another one of the magnetic cores including a third corner portion, a fourth corner portion and another end portion between the third and fourth corner portions, covering the first, second, third and fourth corner portions and the end portions by high-saturation-magnetic-flux-density layers, covering at least one of the end portions by magnetically non-conductive material for a magnetic gap, fixing a positional relationship between the magnetic cores, performing electrical discharge machining of the high-saturation-magnetic-flux-density layers with a cylindrical electrode to determine a longitudinal length of the magnetic gap between the high-saturation-magnetic-flux-density layers over the end portions, and adhering the magnetic cores to each other so that the positional relationship is permanently fixed after the longitudinal length of the magnetic gap is determined.

Since the electrical discharge machining of the high-saturation-magnetic-flux-density layers is performed with the cylindrical electrode (preferably, wire electrode extending substantially parallel to a magnetic gap depth direction) to determine the longitudinal length of the magnetic gap between the high-saturation-magnetic-flux-density layers over the end portions, and the magnetic cores are adhered to each other so that the positional relationship is permanently fixed after the longitudinal length of the magnetic gap is determined, the electrical discharge machining for determining the longitudinal length of the magnetic gap is not deteriorated by a bonding material, for example, a glass, for the permanent fixing of the positional relationship between the magnetic cores, and by a position of the electrode of the electrical discharge machining in a direction perpendicular to a recording tape expansion, a direction perpendicular to a combination of the magnetic head proceeding direction and the width direction of the recording track, or the magnetic gap depth direction.

DETAILED DESCRIPTION OF PREFERRED EMBODIMENTS

Figure 1:
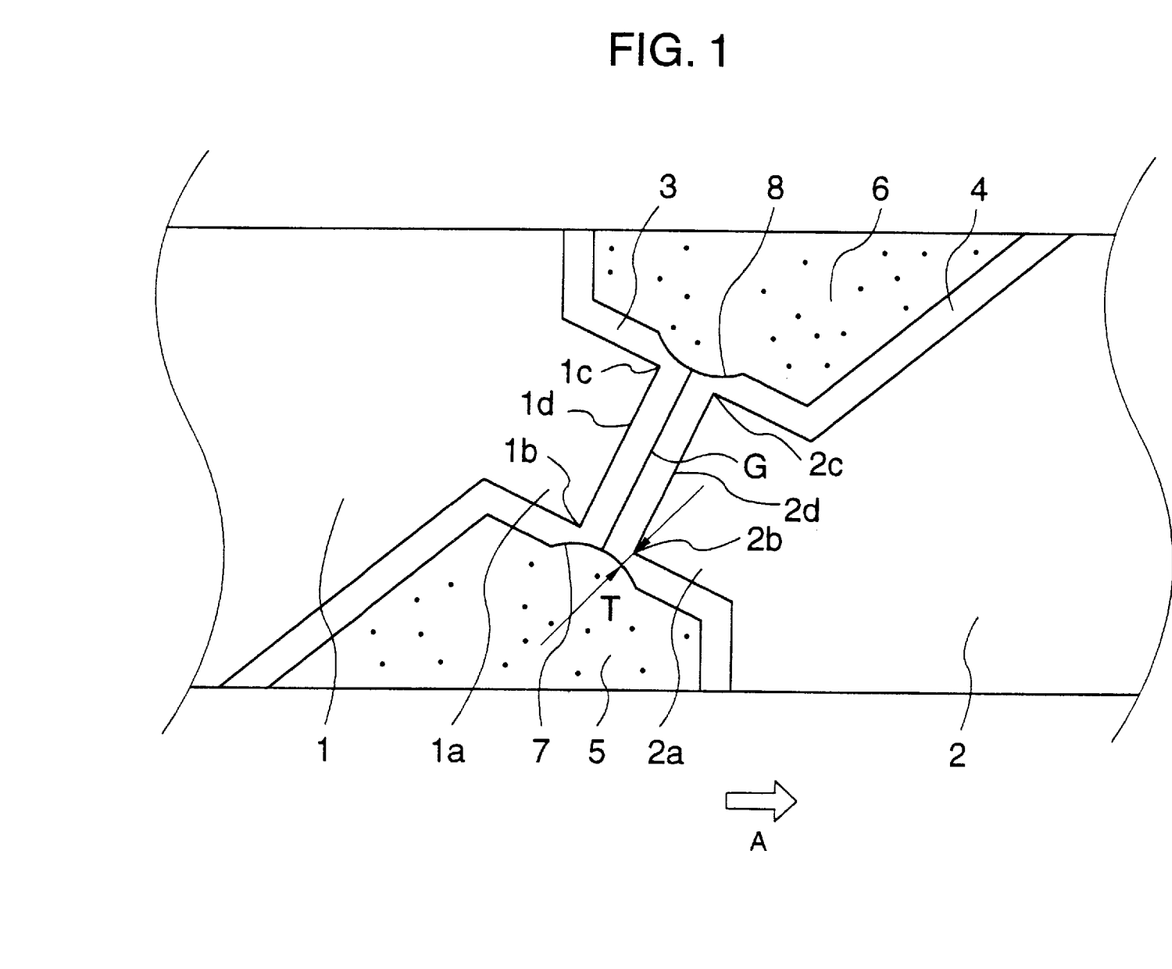
FIG. 1 is a schematic view of an arrangement of a pair of magnetic cores, high-saturation-magnetic-flux-density layers and a magnetic gap in a magnetic head according to the present invention.

As shown in FIG. 1, a magnetic head of the resent invention has a pair of magnetic cores 1 and 2 made of a ferromagnetic material, for example, ferrite. The magnetic cores 1 and 2 have projections 1a and 2a including respectively end portion 1d and corner portions 1b and 1c, and end portion 2d and corner portions 2b and 2c. High-saturation-magnetic-flux-density layers 3 and 4 extend respectively over the end portion 1d and corner portions 1b and 1c, and the end portion 2d and peak portions 2b and 2c. A magnetic gap G made of non-magnetically-conductive material, for example, $SiO_2$ is arranged between the high-saturation-magnetic-flux-density layers 3 and 4 over the end portions 1d and 2d. A longitudinal length (for example, less than about 10 μm) of the magnetic gap G is determined or terminated by grooves 7 and 8. Glass blocks 5 and 6 fill a space between the magnetic cores 1 and 2 so that a positional relationship therebetween is permanently fixed.

Figure 2:
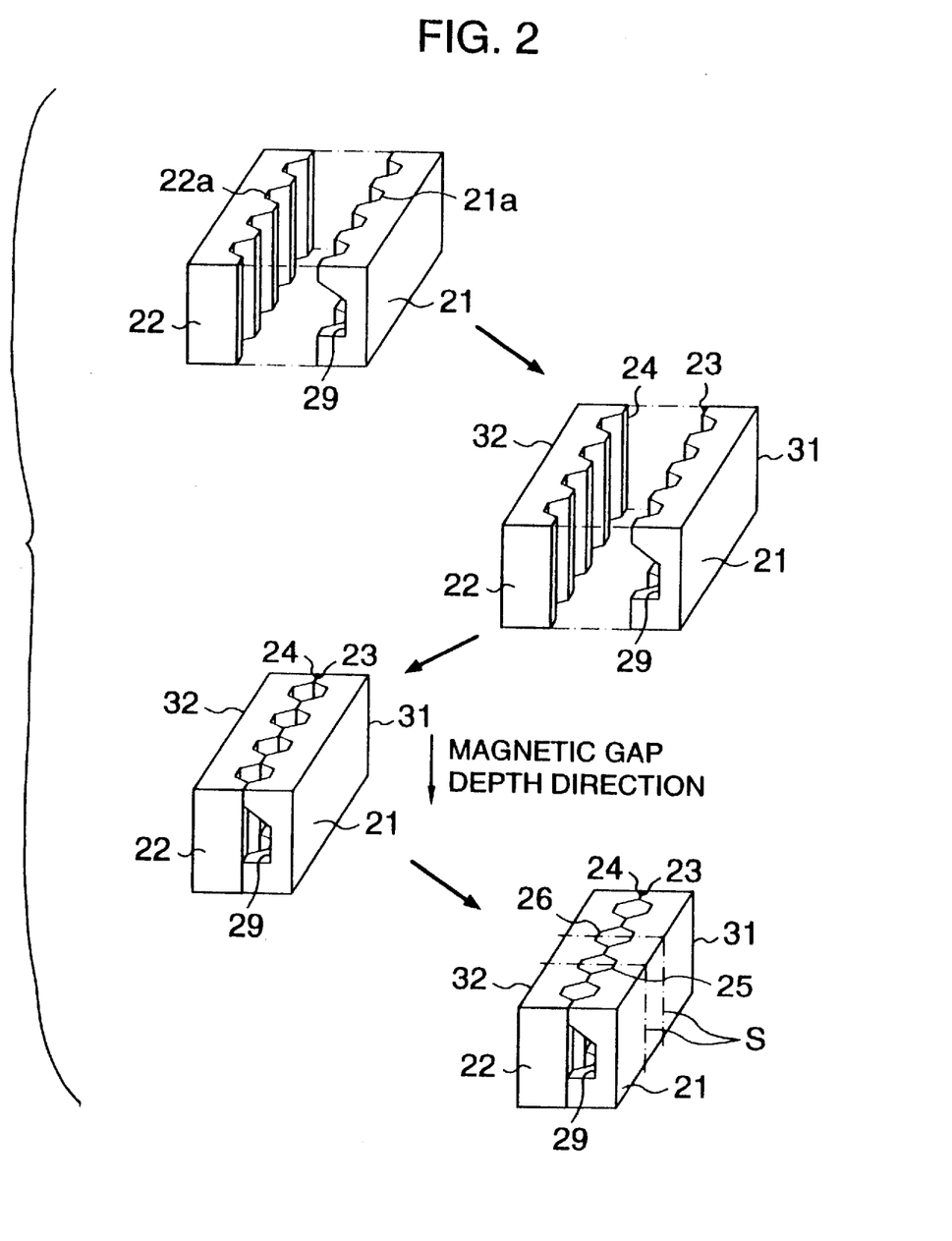
FIG. 2 is a schematic view showing process-steps of a method for producing the magnetic head according to the present invention.
Figure 7:
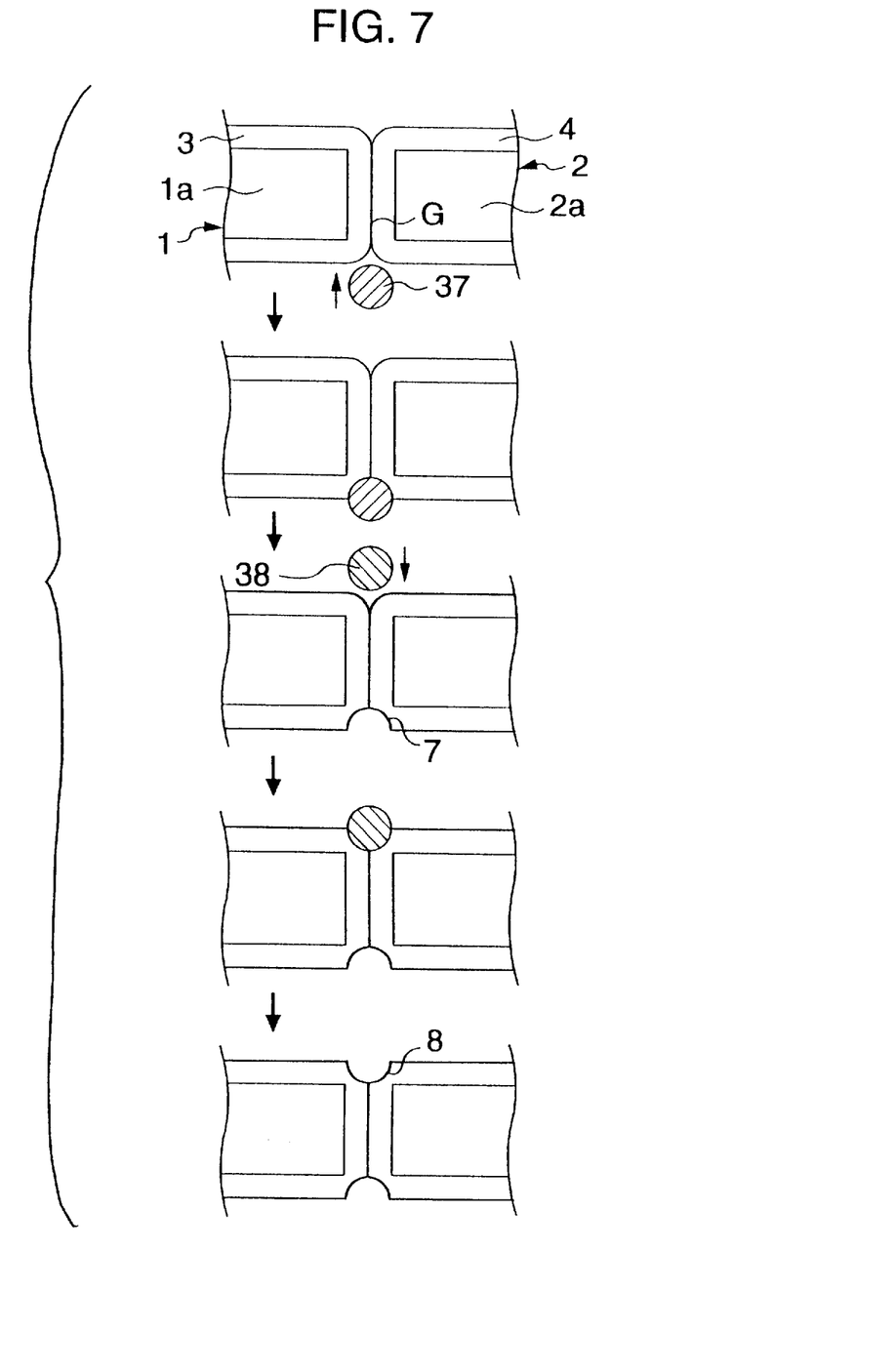
FIG. 7 is a schematic view showing process-steps of electrical discharge machining of the high-saturation-magnetic-flux-density layers with a cylindrical electrode to determine a longitudinal length of the magnetic gap.

As shown in FIGS. 2 and 7, core substrates 21 and 22 made of, for example, Mn-Zn ferrite is formed by lapping surface flattening and dieing of core projection defining grooves 21a and 22a. At least one of the core substrates 21 and 22 has a recess 29 for receiving a magnetic core energizing coil.

Thereafter, high-saturation-magnetic-flux-density layers 23 and 24 are deposited on the grooves 21a and 22a and core projections therebetween through vacuum deposition process, for example, spattering so that magnetic core bodies 31 and 32 are formed. Thereafter, non-magnetically-conductive substance for the magnetic gap G, for example, $SiO_2$, is deposited on at least one of the magnetic core bodies 31 and 32 and a positional relationship between the magnetic core bodies 31 and 32 is fixed desirably.

Thereafter, the longitudinal length (for example, about 10 μm) of the magnetic gap G is determined by electrical discharge machining of the high-saturation-magnetic-flux-density layers 23 and 24 (if necessary with the ferrite core body), with a cylindrical electrode 37. The cylindrical electrode 37 extending substantially parallel to a magnetic gap depth direction has a diameter not less than 1 μm as shown in FIG. 7.

Thereafter, glass block 25 and 26 connect permanently fixedly the magnetic core bodies 31 and 32 to each other, and a combination of the magnetic cores 31 and 32 is divided to magnetic cores along an alternate long and short line S. When the combination of the magnetic cores 31 and 32 is divided along an inclined line relative to a longitudinal direction thereof, azimuth angles of the magnetic cores 31 and 32 are formed.

Figure 3:
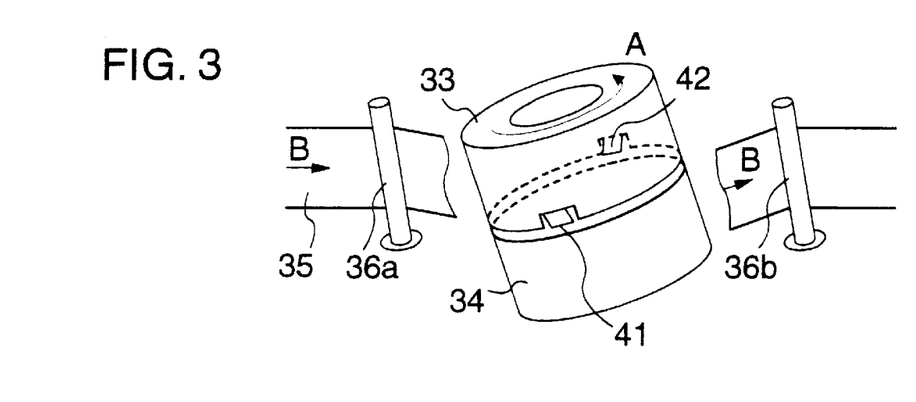
FIG. 3 is a rotary drum head of a magnetic recording apparatus in which the magnetic heads according to the present invention is arranged.
Figure 4:
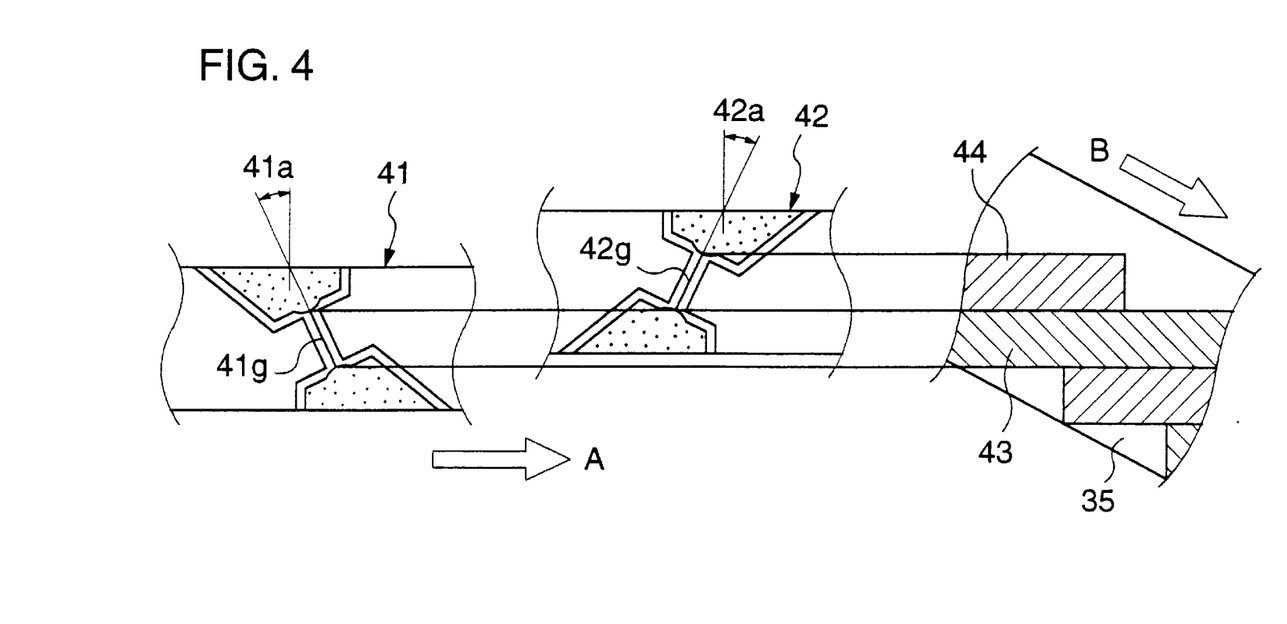
FIG. 4 is a schematic view showing a magnetic gap arrangement and a recording track formation thereby with different recording-track azimuth-angles, in which A arrow shows a magnetic head proceeding direction relative to a recording tape, B arrow shows a recording tape proceeding direction relative to the drum head, a left portion shows a $L_{ch}$ magnetic head, a central portion shows a $R_{ch}$ magnetic head, and a right portion shows recording tracks formed by the $L_{ch}$ and $R_{ch}$ magnetic heads as seen through a magnetic tape.

As shown in FIG. 3, a rotary head drum 33 has $L_{CH}$ and $R_{CH}$ magnetic heads 41 and 42 arranged substantially symmetrically relative to a rotary axis of the rotary head drum 33, azimuth angles of the magnetic heads 41 and 42 are different from each other, and the rotary head drum 33 is rotated on a stationary head drum 34 in a direction indicated by A arrow with a significantly higher speed in comparison with a recording tape feed speed whose direction is indicated by B arrow, so that signals are recorded onto a recording tape 35 guided by inclined posts 36a and 36b. As shown in FIG. 4, by magnetic gaps 41g and 42g of the Lch and Rch magnetic heads 41 and 42 with respective azimuth angles 41a of 20 degrees and 42a of −20 degrees, recording tracks 43 and 44 adjacent to each other are formed on the recording tape 35.

Figure 5:
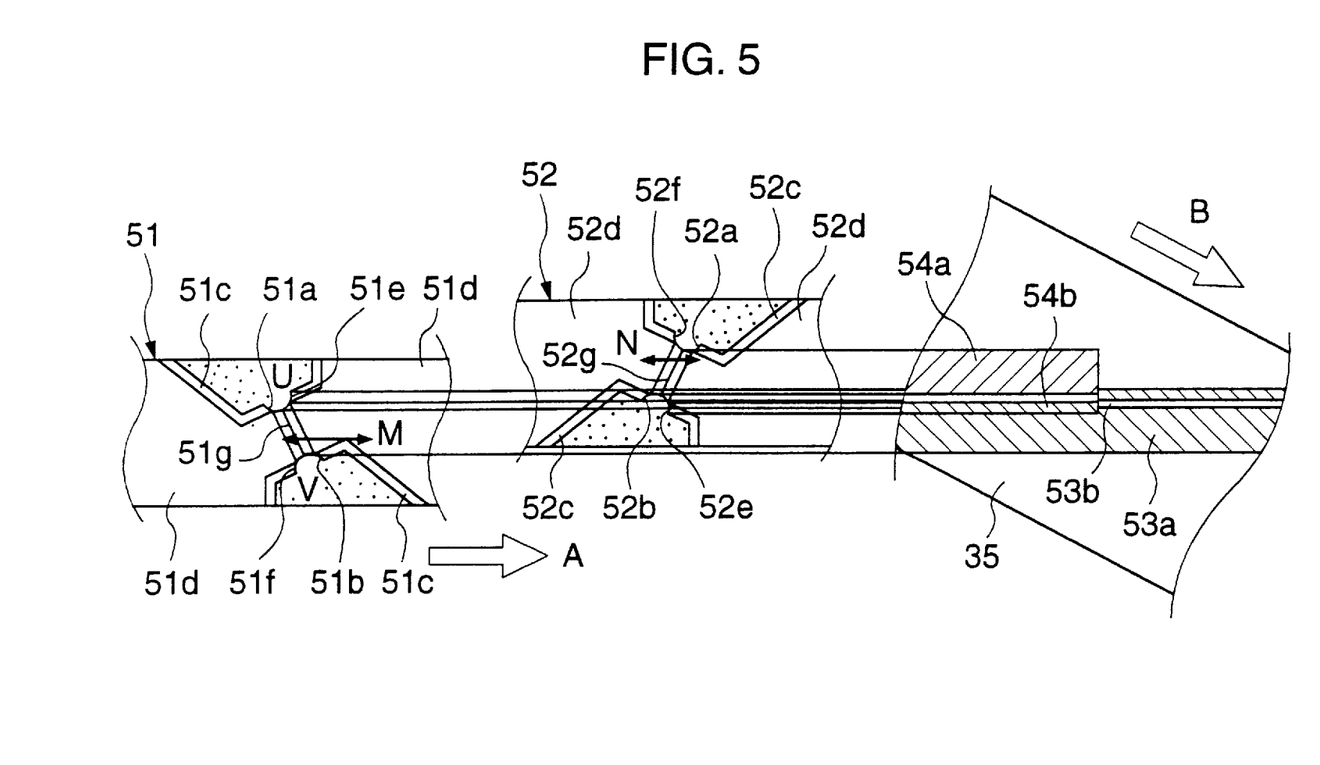
FIG. 5 is a schematic view showing a disturbance of a previously formed recording track by the magnetic head with an undesirable or unacceptable false magnetic head at an outside of the magnetic gap, in which A arrow shows a magnetic head proceeding direction relative to a recording tape, B arrow shows a recording tape proceeding direction relative to the drum head, a left portion shows a $L_{ch}$ magnetic head, a central portion shows a $R_{ch}$ magnetic head, and a right portion shows recording tracks formed by the $L_{ch}$ and $R_{ch}$ magnetic heads as seen through a magnetic tape.

When high-saturation-magnetic-flux-density layers 51c and 52c are interrupted by grooves 51a, 51b, 52a and 52b on corner portions of $L_{CH}$ and $R_{CH}$ magnetic heads 51 and 52 to expose ferrite or magnetic cores 51d and 52d at the corner portions, leakage magnetic flux at each of the interrupted portions of the high-saturation-magnetic-flux-density layers 51c and 52c is generated because of a difference in saturation-magnetic-flux-density between the ferrite cores 51d and 52d and the high-saturation-magnetic-flux-density layers 51c and 52c, so that false magnetic heads 51e, 51f, 52e and 52f generating respective vertical or perpendicular (relative to a tape recording surface) magnetic fields are formed at positions on the interrupted portions of the high-saturation-magnetic-flux-density layers 51c and 52c arranged away from the magnetic gap G in a direction perpendicular to a magnetic head proceeding direction relative to the recording tape, for example, U and V positions.

The interference to the previously formed recording track by the false magnetic heads relatively closer to the magnetic gap is significantly smaller than the interference to the previously formed recording track by the false magnetic heads 51f and 52e, because a distance between each of the false magnetic heads 51f and 52e and the previously formed recording track is significantly smaller than a distance between each of the false magnetic heads relatively closer to the magnetic gap and the previously formed recording track.

Figure 6A:
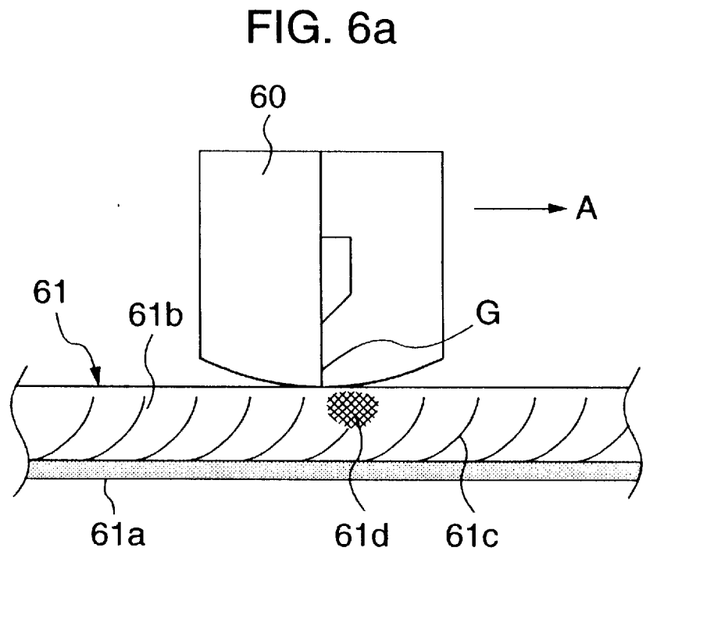
FIG. 6a is a schematic view showing a magnetizing condition on ME type recording tape.
Figure 6B:
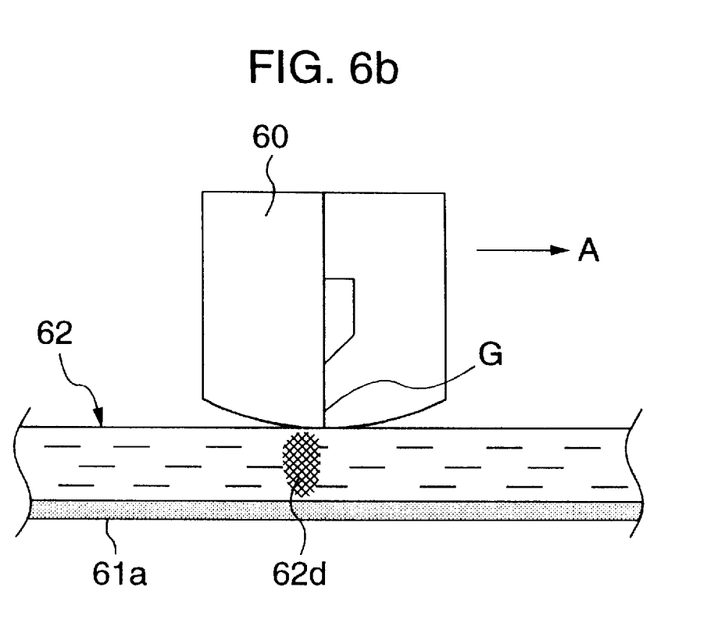
FIG. 6b is a schematic view showing a magnetizing condition on MP type recording tape.

For recording and reading-out signals from ME type recording tape, the false magnetic heads 51e and 52e being front relative to the magnetic gaps 51g and 52g in the magnetic head proceeding direction are important. As shown in FIG. 6a, oblique orientation media 61 are formed on tape base 61a of the ME type recording tape, and an angle of (magnetic) equipotential lines 61c relative to the tape base 61a increases from the tape base 61a toward a recording surface adjacent to the magnetic head. Therefore, the recording tape is magnetized in vertical (relative to the tape base 61a) magnetic field at a front position 61d relative to the magnetic gap G in the magnetic head proceeding direction A. (Refer to Shingakugihou MR95-8 published on June, 1995.) As shown in FIG. 6b, on MP type recording tape, the recording tape is magnetized in horizontal (relative to the tape base 61a) magnetic field at a rear position 62d relative to the magnetic gap G in the magnetic head proceeding direction A.

In this magnetizing principle, as shown in FIG. 5, the magnetic gap 51g and false magnetic head 51e of the $L_{CH}$ magnetic head 51 record the signals on the recording tape 35 by forming a $L_{CH}$ recording track 53a and a $L_{CH}$ false recording track 53b, and the magnetic gap 52g and false magnetic head 52e of the $R_{CH}$ magnetic head 52 record the signals on the recording tape 35 by forming a $R_{CH}$ recording track 54a and a $R_{CH}$ false recording track 54b.

The $L_{CH}$ false recording track 53b is erased by the $R_{CH}$ magnetic head 52, but simultaneously the $L_{CH}$ recording track 53a is partially erased or overlapped by the $R_{CH}$ false recording track 54b, so that a width of the $L_{CH}$ recording track 53a is decreased to a lower limit thereof and an output signal strength from the magnetic head during the reading-out the signals is not sufficient for correctly reading-out signals.

By preventing the false magnetic head 52e from being formed on the $R_{CH}$ magnetic head 52, that is, by covering at least partially the ferrite or magnetic core of the $R_{CH}$ magnetic head 52 with the high-saturation-magnetic-flux-density layer (thickness thereof not less than 0.5 $\mu$m) to prevent only the false magnetic head 52e (formed on the claimed first corner portion), this problem is solved, if at least one of the other false magnetic heads 51e, 51f and 52f is formed by the interruption of the high-saturation-magnetic-flux-density layer on the ferrite or magnetic core corner(s) of the $R_{CH}$ magnetic head 52 and/or the $L_{CH}$ magnetic head 51 (for example, the interruption of the high-saturation-magnetic-flux-density layer on at least one of the corner portions 1b, 1c and 2c as the claimed third corner portion, the claimed fourth corner portion and the claimed second corner portion) of the magnetic cores 1 and 2). When the at least one of the other false magnetic heads 51e, 51f and 52f may be formed by the interruption of the high-saturation-magnetic-flux-density layer on the ferrite or magnetic core corner(s) of the $R_{CH}$ magnetic head 52 and/or the $L_{CH}$ magnetic head 51 while the false magnetic head 52e is prevented from being formed on the $R_{CH}$ magnetic head 52 by covering at least partially the ferrite or magnetic core of the $R_{CH}$ magnetic head 52 with the high-saturation-magnetic-flux-density layer thickness thereof not less than 0.5 $\mu$m to prevent only the false magnetic head 52e, the producing of the magnetic head, particularly determining the longitudinal length of the magnetic gap, is significantly easily performed.

What is claimed is:

1. A magnetic recording apparatus comprising a plurality of magnetic heads for forming respective recording tracks of respective azimuth angles on a recording tape, at least one of the magnetic heads comprising:

a pair of magnetic cores to be energized magnetically, one of the magnetic cores including a first projection having three sides connected respectively at a first corner portion and a second corner portion with an end portion formed along the side between the first and second corner portions, and another one of the magnetic cores including a second projection having three sides connected respectively at a third corner portion and a fourth corner portion with another end portion formed along the side between the third and fourth corner portions;

high-saturation-magnetic-flux-density layers arranged on the magnetic cores respectively so that one of the high-saturation-magnetic-flux-density layers covers at least said end portion of said one of said magnetic cores and another one of the high-saturation-magnetic-flux-density layers covers at least said another end portion of said another one of said magnetic cores, and a saturation-magnetic-flux-density of the high-saturation-magnetic-flux-density layers being higher than that of the magnetic cores; and a magnetic gap between the high-saturation-magnetic-flux-density layers on said end portion of said one of said magnetic cores and said another end portion of said another one of said magnetic cores for magnetizing partially the recording tape;

the first and third corner portions being adjacent to each other on opposite sides of said magnetic gap, the second and fourth corner portions being adjacent to each other on opposite sides of said magnetic gap, and said end portion and said another end portion being adjacent to each other on opposite sides of said magnetic gap;

wherein said one of the magnetic cores is a front magnetic core in a magnetic head proceeding direction relative to the recording tape, said another one of the magnetic cores is a rear magnetic core in the magnetic head proceeding direction, a distance between said first corner portion and a previously formed recording track is smaller than a distance between said second corner portion and the previously formed recording track in a width direction of the recording track, said first corner portion is rear relative to said second corner portion in the magnetic head proceeding direction, and wherein the high-saturation-magnetic-flux-density layer continuously extends around the first corner portion with a thickness not less than 0.5 $\mu$m.

2. A magnetic recording apparatus according to claim 1, wherein a thickness of the high-saturation-magnetic-flux-density layer on at least one of the second, third and fourth corner portions is less than 0.5 $\mu$m.

3. A magnetic recording apparatus according to claim 1, wherein the high-saturation-magnetic-flux-density layer is interrupted on at least one of the second, third and fourth corner portions.

4. A magnetic recording apparatus according to claim 1, wherein a thickness of each of the high-saturation-magnetic-flux-density layers on said end portion and said another end portion is in a range of 1 to 30 $\mu$m.

5. A magnetic recording apparatus according to claim 1, wherein a thickness of the high-saturation-magnetic-flux-density layer on at least one of the second, third and fourth corner portions is less than the thickness of the high-saturation-magnetic-flux-density layer on the first corner portion.

6. A magnetic recording apparatus comprising a plurality of magnetic heads for forming respective recording tracks of respective azimuth angles on a recording tape, one of the magnetic heads comprising:

a pair of magnetic cores to be energized magnetically, one of the magnetic cores including a first projection having three sides connected respectively at a first corner portion and a second corner portion with an end portion formed along the side between the first and second corner portions, and another one of the magnetic cores including a second projection having three sides connected respectively at a third corner portion and a fourth corner portion with another end portion formed along the side between the third and fourth corner portions;

high-saturation-magnetic-flux-density layers arranged on the magnetic cores respectively so that one of the high-saturation-magnetic-flux-density layers covers at least said end portion of said one of said magnetic cores and another one of the high-saturation-magnetic-flux-density layers covers at least said another end portion of said another one of said magnetic cores, and a saturation-magnetic-flux-density of the high-saturation-magnetic-flux-density layers being higher than that of the magnetic cores; and a magnetic gap between the high-saturation-magnetic-flux-density layers on said end portion of said one of said magnetic cores and said another end portion of said another one of said magnetic cores for magnetizing partially the recording tape;

the first and third corner portions being adjacent to each other on opposite sides of said magnetic gap, the second and fourth corner portions being adjacent to each other on opposite sides of said magnetic gap, and said end portion and said another end portion being adjacent to each other on opposite sides of said magnetic gap;

wherein said one of the magnetic cores is a front magnetic core in a magnetic head proceeding direction relative to the recording tape, said another one of the magnetic cores is a rear magnetic core in the magnetic head proceeding direction, a distance between said first corner portion and a previously formed recording track is smaller than a distance between said second corner portion and the previously formed recording track in a width direction of the recording track, the distance between said first corner portion and said previously formed recording track is smaller than a distance between said third corner portion and said previously formed recording track in the width direction of the recording track, and wherein the high-saturation-magnetic-flux-density layer continuously extends around the first corner portion with a thickness not less than 0.5 $\mu$m.

7. A magnetic recording apparatus according to claim 6, wherein a thickness of the high-saturation-magnetic-flux-density layer on at least one of the second, third and fourth corner portions is less than 0.5 $\mu$m.

8. A magnetic recording apparatus according to claim 6, wherein the high-saturation-magnetic-flux-density layer is interrupted on at least one of the second, third and fourth corner portions.

9. A magnetic recording apparatus according to claim 6, wherein a thickness of each of the high-saturation-magnetic-flux-density layers on said end portion and said another end portion is in a range of 1 to 30 $\mu$m.

10. A magnetic recording apparatus according to claim 6, wherein a thickness of the high-saturation-magnetic-flux-density layer on at least one of the second, third and fourth corner portions is less than the thickness of the high-saturation-magnetic-flux-density layer on the first corner portion.

11. A magnetic head for recording signals magnetically by forming a recording track on a recording tape, comprising:

a pair of magnetic cores to be energized magnetically, one of the magnetic cores including a first projection having three sides connected respectively at a first corner portion and a second corner portion with an end portion formed along the side between the first and second corner portions, and another one of the magnetic cores including a second projection having three sides connected respectively at a third corner portion and a fourth corner portion with another end portion formed along the side between the third and fourth corner portions;

high-saturation-magnetic-flux-density layers arranged on the magnetic cores respectively so that one of the high-saturation-magnetic-flux-density layers covers at least said end portion and another one of the high-saturation-magnetic-flux-density layers covers at least said another end portion, and a saturation-magnetic-flux-density of the high-saturation-magnetic-flux-density layers being higher than that of the magnetic cores; and a magnetic gap between the high-saturation-magnetic-flux-density layers on said end portion and said another end portion for magnetizing partially the recording tape;

the first and third corner portions being adjacent to each other on opposite sides of said magnetic gap, the second and fourth corner portions being adjacent to each other on opposite sides of said magnetic gap, and said end portion and said another end portion being adjacent to each other on opposite sides of said magnetic gap;

wherein a distance between said first corner portion and a previously formed recording track is smaller than a distance between said second corner portion and the previously formed recording track in a width direction of the recording track, and wherein the high-saturation-magnetic-flux-density layer continuously extends around the first corner portion with a thickness not less than 0.5 $\mu$m.

12. A magnetic head according to claim 11, wherein a thickness of the high-saturation-magnetic-flux-density layer on at least one of the second, third and fourth corner portions is less than 0.5 $\mu$m.

13. A magnetic head according to claim 11, wherein a high-saturation-magnetic-flux-density layer is interrupted on at least one of the second, third and fourth corner portions.

14. A magnetic head according to claim 11, wherein a thickness of each of the high-saturation-magnetic-flux-density layers on said end portion and said another end portion is in a range of 1 to 30 $\mu$m.

15. A magnetic head according to claim 11, wherein a distance between the first corner portion and the previously formed recording track is smaller than a distance between the third corner portion and the previously formed recording track in a width direction of the recording track.

16. A magnetic head according to claim 11, wherein said one of the magnetic cores is a front magnetic core in a magnetic head proceeding direction relative to the recording tape, and said another one of the magnetic cores is a rear magnetic core in the magnetic head proceeding direction.

17. A magnetic head according to claim 11, wherein said first corner portion is rear relative to the second corner portion in the magnetic head proceeding direction.

18. A magnetic head according to claim 11, wherein a thickness of the high-saturation-magnetic-flux-density layer on at least one of the second, third and fourth corner portions is less than the thickness of the high-saturation-magnetic-flux-density layer on the first corner portion.

* * * * *